United States Patent
Bhattacharjya et al.

(10) Patent No.: US 10,467,638 B2
(45) Date of Patent: Nov. 5, 2019

(54) GENERATING WORK PRODUCTS USING WORK PRODUCT METRICS AND PREDICTED CONSTITUENT AVAILABILITY

(71) Applicant: International Business Machines Corporation, Armonk, NY (US)

(72) Inventors: Debarun Bhattacharjya, Ossining, NY (US); Kush R. Varshney, Ossining, NY (US); Lav R. Varshney, Champaign, IL (US)

(73) Assignee: International Business Machines Corporation, Armonk, NY (US)

( * ) Notice: Subject to any disclaimer, the term of this patent is extended or adjusted under 35 U.S.C. 154(b) by 996 days.

(21) Appl. No.: 14/459,848

(22) Filed: Aug. 14, 2014

(65) Prior Publication Data
US 2016/0048853 A1    Feb. 18, 2016

(51) Int. Cl.
*G06Q 30/02*     (2012.01)

(52) U.S. Cl.
CPC ................................ *G06Q 30/0202* (2013.01)

(58) Field of Classification Search
None
See application file for complete search history.

(56) References Cited

U.S. PATENT DOCUMENTS

| | | |
|---|---|---|
| 6,236,974 B1 | 5/2001 | Kolawa et al. |
| 6,837,148 B1 | 1/2005 | Deschenes et al. |
| 7,953,873 B1 | 5/2011 | Mudarzak |
| 8,249,946 B2 | 8/2012 | Froseth et al. |
| 8,429,027 B2 | 4/2013 | Zheng |
| 2002/0004749 A1* | 1/2002 | Froseth .............. G06Q 10/08 705/16 |
| 2002/0046060 A1 | 4/2002 | Hoskyns et al. |
| 2002/0138358 A1* | 9/2002 | Scheer .............. G06Q 10/063 705/7.36 |
| 2010/0106626 A1 | 4/2010 | Ashrafzadeh et al. |
| 2010/0325075 A1* | 12/2010 | Goel .................... G01V 99/00 706/46 |
| 2013/0035985 A1* | 2/2013 | Gilbert .............. G06Q 10/06375 705/7.31 |
| 2013/0047864 A1 | 2/2013 | Holman et al. |
| 2013/0054387 A1* | 2/2013 | Holman .............. G06Q 50/12 705/15 |

(Continued)

OTHER PUBLICATIONS

Anonymous Inventors, "System and Method for Ingredient Usage and Traceability Unit Planning," Aug. 30, 2011, Database: ip.com; ip.com No. IPCOM000210337D, 5 pages.

(Continued)

*Primary Examiner* — Alan S Miller
*Assistant Examiner* — Arif Ullah
(74) *Attorney, Agent, or Firm* — Robert Bunker; Ryan, Mason & Lewis, LLP (57) ABSTRACT

A method includes predicting availability of a plurality of constituents for one or more future epochs, obtaining one or more metrics for each of a plurality of existing work products, each of the plurality of existing work products using at least one constituent, and generating at least one work product for each of the one or more future epochs based in part on the predicted availability of the constituents and the one or more metrics for the existing work products. The metrics for the existing work products may include quality metrics and novelty metrics.

20 Claims, 4 Drawing Sheets

(56) References Cited

U.S. PATENT DOCUMENTS

2013/0085901 A1    4/2013  Henderson et al.
2013/0173339 A1    7/2013  Briancon et al.
2015/0081608 A1*   3/2015  Linehan ............... G06N 99/005
                                                          706/45

OTHER PUBLICATIONS

D.B. Lobell et al., "California Perennial Crops in a Changing Climate," California Climate Change Center, Aug. 2009, 37 pages.
M.M. Cox et al., "The Application of a Generic Task Routine Decision Making Algorithm to Recipe Selection in Meal Planning," University of Texas Technical Report, Oct. 2002, 50 pages.
A. Diamond et al., "Moving Food Along the Value Chain: Innovations in Regional Food Distribution," US Department of Agriculture, Agricultural Marketing Service, Mar. 2012, 104 pages.
M. Bourlakis et al., "Food Supply Chain Management," Blackwell Publishing, Ltd., Oxford, UK, 2004.
M. Pullman et al., "Food Supply Chain Management: Economic,Social and Environmental Perspectives," Routledge Publishing, New York, 2011.

* cited by examiner

LEGEND:
*BOLD SOLID LINE*: HISTORICAL DATA
*NORMAL SOLID LINE*: MEAN FORECAST
*DASHED LINES*: LOWER (5%) AND HIGHER (95%) PERCENTILES

*FIG. 4*

LEGEND:
*BOLD SOLID LINE*: HISTORICAL DATA
*NORMAL SOLID LINE*: MEAN FORECAST
*DASHED LINES*: LOWER (5%) AND HIGHER (95%) PERCENTILES

GENERATING WORK PRODUCTS USING WORK PRODUCT METRICS AND PREDICTED CONSTITUENT AVAILABILITY

BACKGROUND

The present invention relates to computational creativity, and more specifically, to generation of work products. Various types of work products are made using a set of constituents. As an example, a recipe is a type of work product that utilizes a set of ingredients to make a particular food dish. A menu is a type of work product that includes a set of food dishes. Businesses and other entities often have a set of work products which are offered for sale or used within an entity. Entities may desire to use new and/or different work products over time. For example, a restaurant may periodically alter a set menu.

SUMMARY

According to one embodiment of the present invention, a method comprises predicting availability of a plurality of constituents for one or more future epochs, obtaining one or more metrics for each of a plurality of existing work products, each of the plurality of existing work products using at least one constituent, and generating at least one work product for each of the one or more future epochs based in part on the predicted availability of the constituents and the one or more metrics for the existing work products. The predicting, obtaining and generating, are performed by at least one processing device comprising a processor coupled to a memory.

According to another embodiment of the invention, an article of manufacture comprises a computer readable storage medium for storing computer readable program code. The computer readable program code, when executed, causes a computer to predict availability of a plurality of constituents for one or more future epochs, obtain one or more metrics for each of a plurality of existing work products, each of the plurality of existing work products using at least one constituent, and generate at least one work product for each of the one or more future epochs based in part on the predicted availability of the constituents and the one or more metrics for the existing work products.

According to another embodiment of the invention, an apparatus comprises a memory and a processor device operatively coupled to the memory. The processor device is configured to implement a forecasting module configured to predict availability of a plurality of constituents for one or more future epochs, an assessment module configured to obtain one or more metrics for each of a plurality of existing work products, each of the plurality of existing work products using at least one constituent, and a generation module configured to generate at least one work product for each of the one or more future epochs based in part on the predicted availability of the constituents and the one or more metrics for the existing work products.

These and other embodiments of the invention will become apparent from the following detailed description of illustrative embodiments thereof, which is to be read in connection with the accompanying drawings.

DETAILED DESCRIPTION

Illustrative embodiments of the invention may be described herein in the context of illustrative methods, systems and devices for work product generation. However, it is to be understood that embodiments of the invention are not limited to the illustrative methods, systems and devices described but instead are more broadly applicable to other suitable methods, systems and devices.

As used herein, the term "work product" is used to refer to a material or abstract object. Work products include manufactured goods such as electronic circuits, food products, and pharmaceuticals, as well as culinary recipes, menus, complex travel itineraries, financial portfolios, catalogs, etc. Some work products are also work plans, in that they include a process that realizes another work product. For example, a culinary recipe is both a work product and a work plan for creating another work product, namely, a food dish. In addition, one work product may comprise other work products. For example, a menu is an example of a work product which may include other work products such as food dishes or recipes.

As used herein, the term "constituent" is used to refer to components used or to be used in forming a work product. As an example, a menu includes one or more food dishes, each of which uses one or more ingredients. In this example, the ingredients are examples of constituents. The food dishes themselves may also be considered examples of constituents of the menu. As another example, a complex travel itinerary includes a number of events, such as visiting historical sites, parks, museums, restaurants, etc. Each event may be considered a constituent of the travel itinerary. As a further example, a fashion catalog may include various clothing items and outfits. Each outfit or clothing item is made from one or more raw materials. These raw materials are examples of constituents. Each outfit or clothing item in the fashion catalog may also be considered a constituent of the fashion catalog. Numerous other examples are possible.

Embodiments of the invention provide systems, devices and methods which allow for generation of work products. In some embodiments, work products are generated based on the predicted availability of constituents used or to be used in forming the generated work product as well as one or more metrics relating to one or more existing work products.

Creative establishments aim to prepare creative products for their customers. A creative work product may be a set of existing work products or constituents that, when considered together, are considered to be creative by customers. Computational creativity algorithms may be used to generate novel work products. As an example, consider a restaurant that seeks to prepare a creative menu. A creative menu may include individual food dishes which are considered to be novel and/or surprising, as well as novel and/or surprising combinations of food dishes. As another example, an apparel store may seek to offer a creative ensemble of clothing items.

In some embodiments, creative products include transformations and combinations of a potentially large and diverse set of raw materials or constituents. As an example, a restaurant may wish to use Italian sauces together with Chinese herbs and spices to create new and exciting food dishes. A restaurant may also seek to use new or surprising combinations of existing food dishes.

In order to effectively design and plan creative products, an establishment such as a restaurant or apparel store should consider the flow of materials in their respective supply chains, so as to manage the risk of potential disruptions in raw material availability. As an example, weather events may affect the availability of food ingredients. If a weather event affects the availability of tomatoes but does not affect the availability of avocados, then a restaurant may wish to prepare and serve creative alternatives to guacamole which use avocados.

Establishments may also wish to couple inventory stocking with work product offerings in generating creative products. As an example, a restaurant may seek to take into account predicted availability of ingredients in order to generate menus each day, week, month, etc. which are considered to be creative. Thus, the restaurant can couple inventory stocking with menu generation so as to have creative dishes with reduced supply chain risk.

Figure 1:
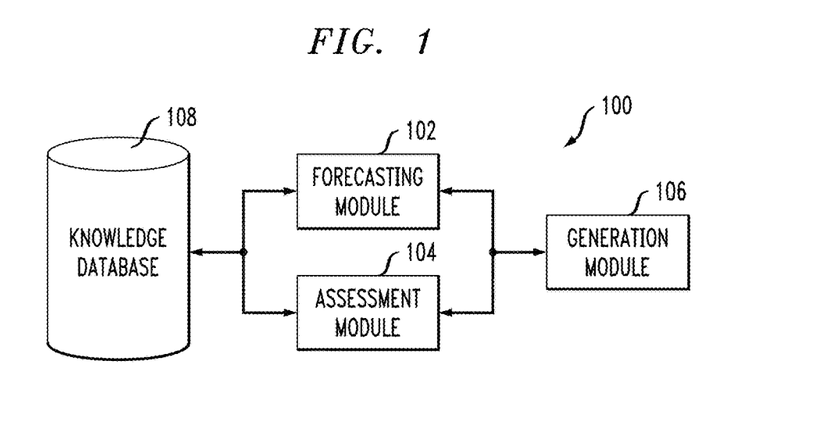
FIG. 1 depicts a system for work product generation according to an embodiment of the invention.

FIG. 1 illustrates a system 100 for work product generation. The system 100 includes a forecasting module 102, assessment module 104, generation module 106, and knowledge database 108. As will be described in further detail blow, each of the modules shown in system 100 may be implemented using hardware, software or a combination of hardware and software running on one or more computing or other processing devices.

As shown in FIG. 1, the forecasting module 102 and assessment module 104 are connected to knowledge database 108. The forecasting module 102 and assessment module 104 are configured to query or otherwise exchange information with the knowledge database 108.

The knowledge database 108 stores information relating to existing work products and constituent availability. This information may include lists of constituents used in forming existing work products, statistical analysis of clusters of existing work products and constituents, user evaluation and feedback information for existing work products, supply chain configurations, etc.

Forecasting module 102 is configured to predict availability of constituents for future epochs. In some embodiments, the forecasting module 102 uses information pertaining to a supply chain and amounts of ordered constituents to predict the availability of constituents at an establishment. Such information may be obtained at least in part from knowledge database 108. Stochastic forecasting techniques based on a time series regression model may be used in some embodiments to predict availability of constituents.

Assessment module 104 is configured to obtain metrics for existing work products. The assessment module 104 in some embodiments builds models for assessing creativity of work products using information obtained from knowledge database 108. Some embodiments use computational creativity models that combine metrics for measuring novelty with metrics for measuring human hedonic perception to evaluate or otherwise assess work products.

Generation module 106 is configured to generate at least one work product for each of one or more future epochs based on information received from the forecasting module 102 relating to predicted availability of constituents and information received from the assessment module 104 relating to metrics for existing work products. In some embodiments, the generation module 106 formulates and solves an optimization model to generate work products that increase a desired characteristic subject to certain constraints, e.g., maximize profits under creativity constraints. The generation module 106 may generate a single work product for each future epoch, or may generate a set of two or more work products for each epoch. The set of generated work products for each epoch may be provided to a user for selection.

Forecasting module 102, as discussed above, is configured to predict availability of constituents for future epochs. In some embodiments, forecasting module 102 has or receives information on the current availability of constituents for a current epoch as well as information on the historical availability of constituents for one or more previous epochs. The forecasting module 102 may also have or receive information relating to the amounts of constituents ordered for a next epoch. Using such information, the forecasting module 102 creates a probability distribution for each constituent for each of one or more future epochs. In some embodiments, the forecasting module 102 takes into account other information, such as supply chain configurations and other constraints, in addition to or in place of information regarding the current and historical availability of constituents.

Figure 2:
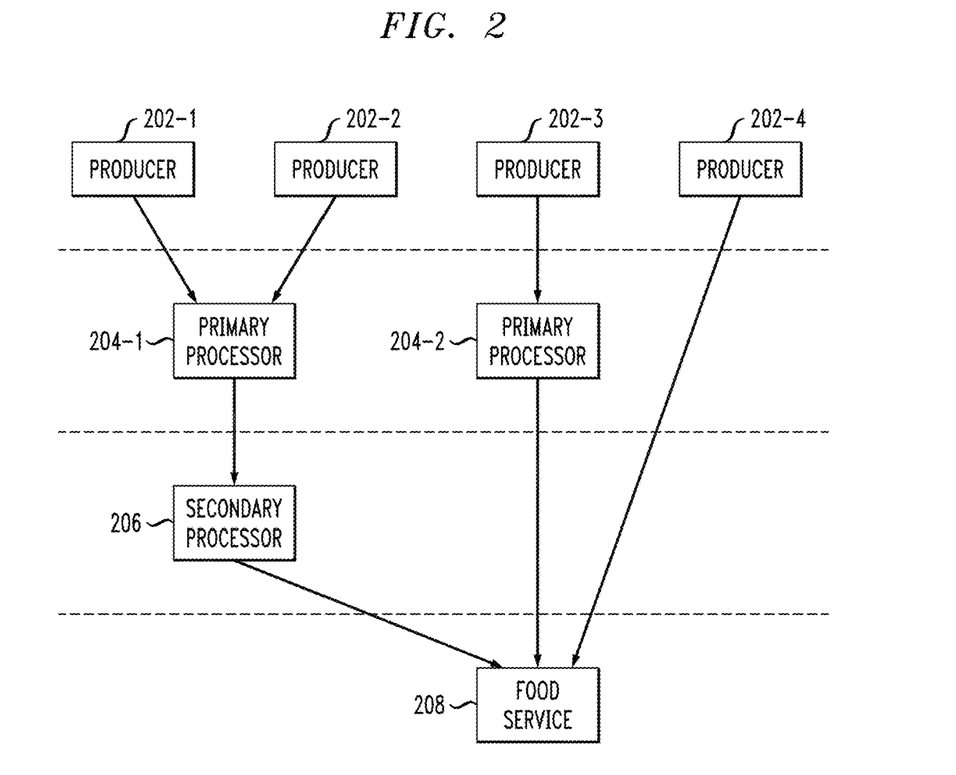
FIG. 2 depicts an example of a supply chain configuration according to an embodiment of the invention.

FIG. 2 illustrates an example of a supply chain configuration. A first level of the supply chain includes producers 202-1, 202-2, 202-3 and 202-4. The producers 202 may be farmers, ranchers, fishermen, etc. The next level of the supply chain includes primary processors 204-1 and 204-2. The primary processors 204-1 and 204-2 may be entities which freeze or can products from the producers 202-1, 202-2 and 202-3. The next level of the supply chain includes secondary processor 206, which may be a breading, packaging or other entity which processes products from primary processor 204-1. In the last level of the supply chain, there is food service 208, which may be a direct customer facing establishment such as a restaurant, hotel, etc. The food service 208 may interface with entities at various levels of the supply chain, such as producer 202-4, primary processor 204-2 and secondary processor 206. The supply chain in FIG. 2 is shown by way of example only. Other supply chains may include more or fewer levels, as well as different types of entities.

Examples of other constraints which may be used by the forecasting module 102 in predicting the availability of constituents include, by way of example, delivery times for constituents, seasonality effects relating to constituents, climate and weather considerations, infestations, outbreaks, predictions regarding political instability, human error, competitor strategies, etc. These constraints may be analyzed in conjunction with the supply chain configuration. For example, a drought may affect the amounts of constituents available from producers 202 in the supply chain shown in FIG. 2. Labor strikes may affect the amounts of constituents that are available from producers 202, primary processors 204 and secondary processor 206. Climate and weather considerations may affect crops, delivery schedules, etc.

Figure 3:
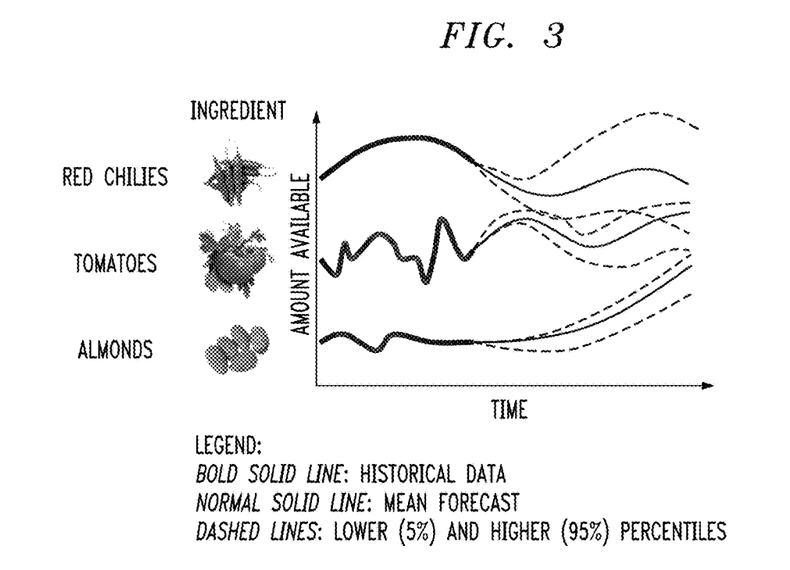
FIG. 3 depicts an example of constituent forecasting according to an embodiment of the invention.
Figure 4:
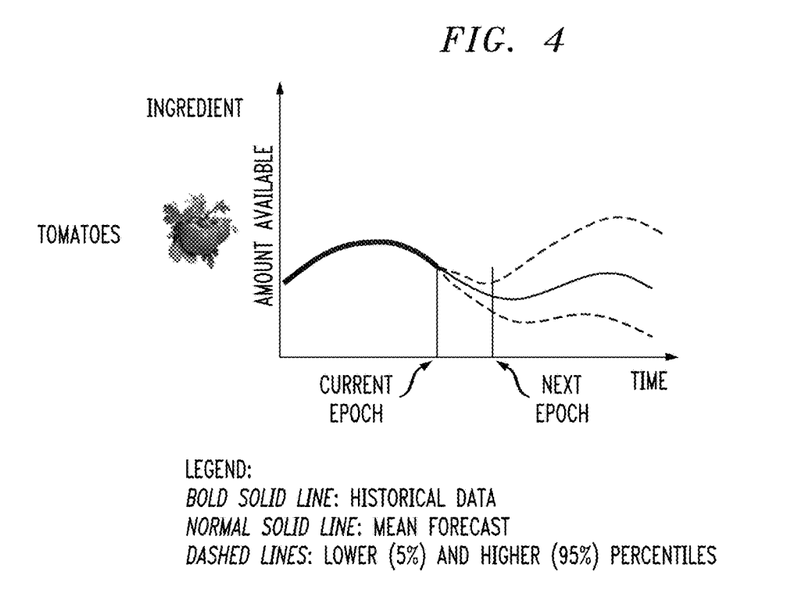
FIG. 4 depicts another example of constituent forecasting according to an embodiment of the invention.

FIGS. 3 and 4 show examples of constituent forecasting which may be performed by forecasting module 102. FIG. 3 shows a plot of the availability of three constituents—red chilies, tomatoes and almonds. The plot shows the available amounts of such constituents over time. The solid bold line represents known information obtained from historical data, and the normal solid line shows a mean forecast of the availability for respective ones of the constituents. The dashed lines show the lower (5%) and higher (95%) percentiles for predicted availability. FIG. 4 shows a plot of the constituent forecasting for tomatoes. As shown in the FIG. 4 plot, the availability of tomatoes is predicted to decrease between the current epoch and the next epoch. Generation module 106 may take into account such information when generating work products, as will be discussed in further detail below.

FIGS. 3 and 4 show stochastic forecasts representing an establishment's beliefs representing uncertainty relating to ingredient availability. Various other statistical techniques may be used for forecasting, such as Monte Carlo methods. Forecasting may involve time series modeling and regression techniques. Information relating to supply chains may be used for such forecasting. Crop yields, for example, may be forecast based on temperature predictions, bearing acreage, etc. Regression techniques can use such information to create a forecast of availability of crops or other constituents.

Assessment module 104, as described above, obtains metrics for existing work products. In some embodiments, these metrics are used to measure the creativity, denoted $h(\square)$, of a work product. The creativity $h(\square)$ may be determined as a function of quality and novelty metrics. Quality of a work product may be determined using human hedonic perception information, such as the use of a human hedonic perception scoring function learned from historical data. Such historical data may be obtained from knowledge database 108.

The novelty of a work product may be determined using a surprise metric. As an example, the generation module 106 may be used for sequential creative menu generation. When an establishment such as a restaurant generates creative menus for several epochs, novelty metrics should evolve over time. If a creative menu in one epoch uses a unique or surprising combination of constituents or dishes, this should be taken into account for future assessments by the assessment module 104. A creative food pairing which is novel for one epoch may be less novel in a next epoch and subsequent epochs. Some embodiments use a temporal version of Bayesian surprise for determining novelty metrics.

Bayesian surprise involves calculating posterior probability based on prior probability. Let M be a set of existing work products known to an observer. Let $M \in M$ be a work product in the set of known existing work products, and let D be a new work product being observed not in the set M. The Bayesian surprise can be calculated using the following equation:

$$\text{Bayesian surprise} = \int_M p(M|D) \log \frac{p(M|D)}{p(M)} dM \quad (1)$$

where p denotes a probability distribution function.

Figure 5:
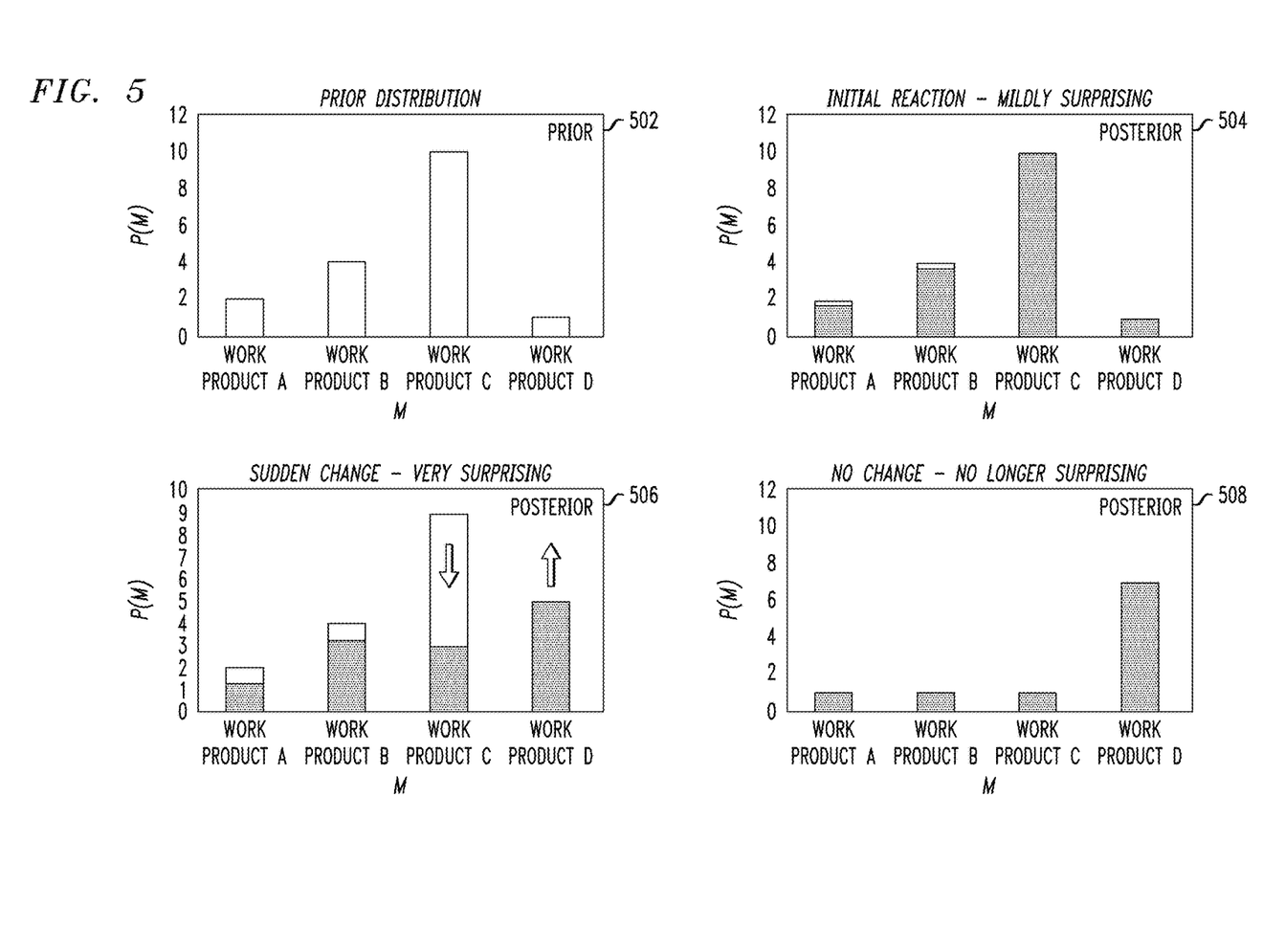
FIG. 5 depicts an example of obtaining surprise metrics according to an embodiment of the invention.

FIG. 5 illustrates an example of temporal Bayesian surprise. Graph 502 shows a prior distribution of work products A-D. The graph 502 charts the prior probability distribution P(M) for a model space involving the work products A-D. Graphs 504, 506 and 508 chart the posterior probability distribution P(M|D) based on new observation D over time. Graph 504 shows initial observation of an unsurprising or mildly surprising event. An unsurprising event, for example, may be considered to be a normal or mildly creative menu offered by an establishment for a current epoch. Graph 506 shows observation of a very surprising event, leading to significant changes in the posterior probability of work products C and D in a next epoch. This may be the result of, for example, an establishment offering a new menu which prominently features a creative new dish, e.g., the work product D. If this same new menu is used for several additional epochs, however, the initially surprising event, e.g., the prominence of the new featured dish, is no longer surprising.

Generation module 106, as described above, is configured to generate work products for future epochs. In some embodiments, this includes building an optimization model. The optimization model may be a sequential decision problem for two or more future epochs. Various techniques may be used to solve the optimization model, including backward recursion techniques. The optimization model may be formulated to maximize total expected profits over time subject to various constraints.

Such constraints include, by way of example, availability-based constraints determined using predicted availability of constituents and creativity-based constraints determined using work product metrics for existing work products and generated work products. As an example, the creativity-based constraints may specify that the creativity of a generated work product exceed a user-defined threshold and the availability-based constraints may specify that the amounts of constituents used by the generated work product in a given epoch cannot exceed predicted availability of the constituents for the given epoch.

The generation module 106, in addition to generating a work product, may also generate an inventory order for future epochs. The inventory orders specify respective amounts of constituents to order in a given epoch to satisfy the generated work product associated with the given epoch.

An example of an optimization model used in some embodiments is described below in the context of menu generation. This optimization model, however, may be modified for use in other contexts, such as itinerary generation, catalog generation, etc. In the optimization model described below, $i \in \{1, \ldots, M\}$ denotes a dish index, $j \in \{1, \ldots, N\}$ denotes an ingredient index and $t \in \{1, \ldots, T\}$ denotes an epoch index. More generally, i may denote a work product index and j may denote a constituent index. The optimization model uses a number of decision variables, including $x_{ij}^t$, $y_i^t$, and $z_i^t$. $x_{ij}^t \in \{0,1\} \forall i,j,t$ indicates the amount of ingredient j in dish i at epoch t. $y_i^t \in \{0,1\} \forall i,t$ indicates whether dish i is in the selected menu at epoch t. $z_i^t \in \{0,1\} \forall i,t$ indicates whether dish i is selected in menus in both epochs t and t–1.

$A_j^t$ and $C_j^t$ denote the amount of ingredient j available at epoch t and the amount of ingredient j consumed in the menu at epoch t, respectively. $O_j^t$ denotes the amount of ingredient j ordered at epoch t. In some cases, the amount of an ingredient ordered in one epoch may affect the availability of that ingredient for subsequent epochs. $L_D^t$ and $U_D^t$ denote lower and upper limits on the number of dishes in the menu at epoch t, respectively.

The optimization model may make use of a number of functions. For example, the revenue from a menu at epoch t is represented as $f_R^t(x_{ij}^t, y_i^t \forall i,j)$. The ordering cost at epoch t is represented as $f_O^t(O_j^t \forall j)$. The revenue function $f_R^t$ and ordering cost function $f_O^t$ may be stochastic functions. The inventory and operating cost at epoch t is represented as $f_I^t(A_j^t, C_j^t \forall j)$. The inventory and operating cost function $f_I^t$ may including holding costs, maintenance costs, etc. The cost of transferring systems if a dish i was not prepared in the previous epoch is represented as $f_T^t$ ($z_i^t$ $\forall i$). In some instances, using a new dish in a menu requires new equipment or training of staff. The transferring cost function $f_T^t$ represents such costs.

The creativity metric is represented as $h(x_{ij}^t, y_i^t \forall i,j,t)$. The creativity metric measures the creativity of menus over time. In some embodiments a lower limit on creativity is denoted $L_{Creativity}$. Certain functions in the optimization model may be based in part on the creativity metric. As an example, the revenue function $f_R^t$ may in some embodiments be a function of the creativity metric $h(x_{ij}^t, y_i^t \forall i,j,t)$. A more creative menu is likely to increase sales for an establishment such as a restaurant. Creativity may in some cases also increase costs. For example, the creativity metric may affect the transferring function $f_T^t$.

An objective function is used in some embodiments for solving the optimization model. The objective function, for example, may seek to maximize total expected profits subject to various constraints. Such constraints include, by way of example, creativity restrictions, upper and lower limits on the total number of dishes in the menu, specifying that consumption must be less than predicted availability, etc. as described above. The objective function may make use of a number of stochastic functions, and take into account the various functions described above.

An example of an objective function which may be used in some embodiments is the following $$V^t(A_j^t \ \forall \ j) = \max_{x_{ij}^t; y_i^t \forall i,j,t} \left[ \begin{array}{c} E[f_R^t(x_{ij}^t, y_i^t \ \forall \ i,j) - f_C^t(A_j^t, C_j^t, O_j^t, z_i^t \ \forall \ i,j)] + \\ E[V^{t+1}(A_j^{t+1} \ \forall \ j)] \end{array} \right]$$

s.t.

$x_{ij}^t \geq 0 \ \forall \ i,j,t$ $y_i^t = 1 - \prod_j (1 - x_{ij}^t) \forall \ i,t$ $z_i^t = \begin{cases} 1, & t = 1 \\ y_i^t y_i^{t-1}, & t > 1 \end{cases} \forall \ i$ $L_D^t \leq \sum_i y_i^t \leq U_D^t$ $C_j^t \leq A_j^t \ \forall \ j,t$ $h(x_{ij}^t, y_i^t \forall \ i,j,t) \geq L_{Creativity}$ The constraints for $x_{ij}^t$ and $y_i^t$ specify that dishes are in the menu when they contain at least one ingredient. The constraint $z_i^t$ specifies whether the dish was created in the previous epoch. The constraint for upper and lower limits on the total number of dishes is represented as $$L_D^t \leq \sum_i y_i^t \leq U_D^t \cdot C_j^t = \sum_i x_{ij} \ \forall \ j,t$$

represents total consumption of an ingredient as the sum of ingredient amounts used in the menu, and is constrained in that consumption must be less than predicted availability. $f_C^t$ is a total cost computation, and is the sum of $f_O^t$, $f_I^t$ and $f_T^t$, e.g., $$f_C^t(A_j^t, C_j^t, O_j^t, z_i^t, \forall i,j) = [f_O^t(O_j^t \forall j) + f_I^t(A_j^t - C_j^t \forall j) + f_T^t(z_i^t \forall i)] \forall t.$$

$A_j^{t+1}$ in the objective function above represents availability in a next epoch, and is determined according to $$A_j^{t+1} = g_j(A_j^t - C_j^t + O_j^t) \forall j,t.$$

$A_j^{t+1}$ may be a random variable, and $g_j$ is stochastic function. $h(x_{ij}^t, y_i^t \forall i,j,t) \geq L_{Creativity}$ represents the creativity restriction for the optimization model. As described above, the revenue function $f_R^t$ depends on creativity metric $h(x_{ij}^t, y_i^t \forall i,j,t)$.

In some embodiments, the optimization model combines inventory ordering or stocking with work product generation. As an example, the decision maker at a restaurant who creates menus may also make inventory ordering decisions. Thus, it is possible to couple these decisions resulting in efficiencies in menu generation and inventory ordering. The objective function described above may be adjusted so as to take into account amounts of raw materials ordered or to be ordered as a decision. Using the same constraints described above, the resulting objective function is $$V^t(A_j^t \ \forall \ j) = \max_{x_{ij}^t; y_i^t; O_j^t \forall i,j,t} [(f_R^t(x_{ij}^t, y_i^t \ \forall \ i,j) - f_C^t(A_j^t, C_j^t, O_j^t, z_i^t \ \forall \ i,j)) +$$

$$E[V^{t+1}(A_j^{t+1} \ \forall \ j)]].$$

The following scenarios are presented to illustrate work product generation using system 100 in the context of menu generation, itinerary generation and catalog generation. It is to be appreciated, however, that embodiments are not limited solely to these contexts or scenarios. In addition, the scenarios below are simplified for clarity of illustration. For example, each scenario considers only a single constituent subject to variations in availability. In many other scenarios, however, a plurality of constituents are subject to variations in availability. Each scenario also considers only a single decision within the context of the menu, itinerary or catalog. Embodiments, however, may be used to generate multiple portions of and/or entire work products such as menus, itineraries and catalogs.

For menu generation, consider a restaurant which seeks to generate creative menus for their customers. In this example, the restaurant considers two time epochs, e.g., the current week and the following week. As will be appreciated, in other contexts epochs may be longer or shorter in duration. Further, the restaurant has decided on most of the menu for both the current week and the following week. The restaurant, however, has a surplus of avocados and thus seeks to add a dish to the menu for the current week and the following week which makes use of avocados. The restaurant is deciding between a relatively standard avocado dish, e.g., guacamole, and a relatively novel avocado dish, e.g., Filipino avocado dessert.

Using the forecasting of tomatoes shown in the FIG. 4 plot, the restaurant expects the availability of tomatoes to decrease for the following week relative to the current week. In this scenario, the other relevant ingredients are assumed to be generally available. Using menu assessment models, the restaurant determines that guacamole is less novel than Filipino avocado dessert. The menu assessment models, however, also indicate that guacamole has higher quality as measured by a hedonic perception metric.

Using a temporal novelty model, the novelty is considered somewhat low when the same avocado dish is used in consecutive weeks. Thus, in this example, novelty is lowest when guacamole is used in both epochs, e.g., the current week and the following week.

Using an optimization model, such as the optimization model described above, the system 100 in this example will generate an optimal menu for each week. A representative solution would be for the restaurant to use a generated menu which serves guacamole during the current week and to use a generated menu which serves Filipino avocado dessert during the following week. These generated menus are based in part on the supply chain issues predicting a decreasing availability of tomatoes for the next epoch. If not enough tomatoes are available and the restaurant has made plans to serve guacamole, then the restaurant may suffer losses by being unable to meet demand, wastage of ingredients, etc. Creativity based issues also indicate that preparing the same avocado-based dish in consecutive epochs may not meet creativity-standards. The use of a creative dish like Filipino avocado dessert, as well as preparing different avocado dishes for consecutive epochs, has a positive impact on profits by creating additional demand while also avoiding overreliance on tomatoes which are subject the supply chain risk.

For itinerary generation, consider a travel agency which seeks to provide creative travel itineraries for customers seeking to travel. In this scenario, a travel agency considers two time epochs, e.g., a current weekend and a following weekend. The travel agency has decided on most of the events for travel itineraries in a given city for both the current weekend and the following weekend. The travel agency has a contract for buses for each weekend, and thus wishes to use bus tours in the travel itineraries for both weekends. The travel agency is deciding between a relatively standard sightseeing tour of outdoor historical landmarks and a relatively novel sightseeing tour of various local restaurants offering menu tastings.

Using forecasting techniques, the travel agency expects poor weather conditions for the current weekend relative to the next weekend. The outdoor landmark tour may be negatively affected by such weather conditions, while the indoor tasting tour would not be. Assessment models indicate that although the tasting tour is more novel, the landmark tour has higher user ratings.

Using an optimization model, such as the optimization model described above, the system 100 in this scenario will generate an optimal travel itinerary for each weekend. A representative solution would be for the travel agency to offer an itinerary including the tasting tour in the current epoch and an itinerary including the landmark tour in the next epoch. The use of different itineraries for the successive weekends increases creativity while also accounting for the weather constraints which may negatively impact events in the itineraries.

For catalog generation, consider a clothing retailer which seeks to provide creative catalogs for customers. In this scenario, the clothing retailer considers two time epochs, e.g., a current month and a following month. The clothing retailer has decided on most of the apparel to offer in the catalogs for both months, but is yet to decide on special items to offer for each month. The retailer is deciding between a standard special involving accessories and relatively novel special involving custom-tailored suits.

Using forecasting techniques, the clothing retailer anticipates a labor strike in the next month amongst tailors. Thus, orders on custom-tailored suits may be significantly delayed in the next month while the accessories may have a more stable supply chain and thus not be negatively impacted by the labor strike. Assessment models indicate that the custom-tailored suit special is more novel than the accessories special, although both receive approximately equivalent user ratings.

Using an optimization model, such as the model described above, the system 100 in this scenario will generate an optimal catalog for each month. A representative solution would be for the retailer to offer a special on custom-tailored suits in the catalog in the current month and a special on accessories in the catalog in the following month.

As noted above, the above-described scenarios are presented solely for illustration. Embodiments are applicable to various other contexts such as perfumery, and may involve more complex scenarios involving a plurality of constrained constituents and selection of a plurality of portions of a generated work product.

Figure 6:
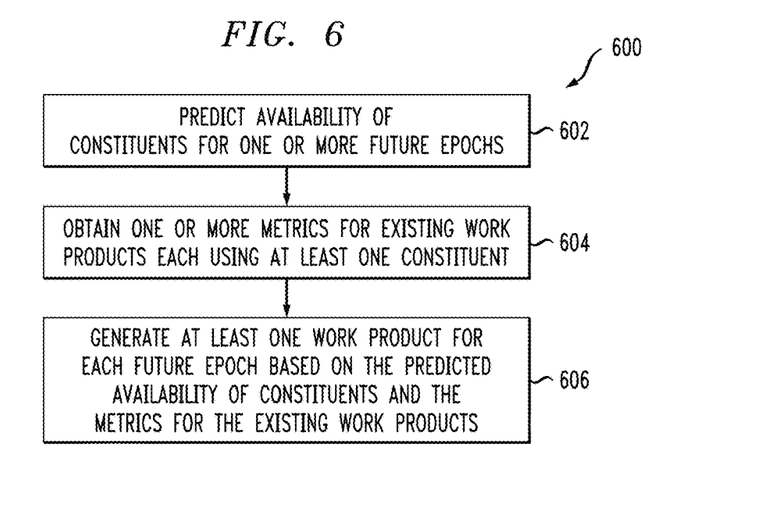
FIG. 6 depicts a methodology for work product generation according to an embodiment of the invention.

FIG. 6 illustrates a methodology 600 for work product generation. The methodology 600 includes predicting availability of constituents for one or more future epochs in block 602, obtaining one or more metrics for existing work products each using at least one constituent in block 604, and generating at least one work product for each future epoch based on the predicted availability of constituents and the metrics for the existing work products in block 606. The methodology 600 may be performed by the system 100. For example, block 602 may be executed using forecasting module 102, block 604 may be executed using assessment module 104 and block 606 may be executed using generation module 106.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 7:
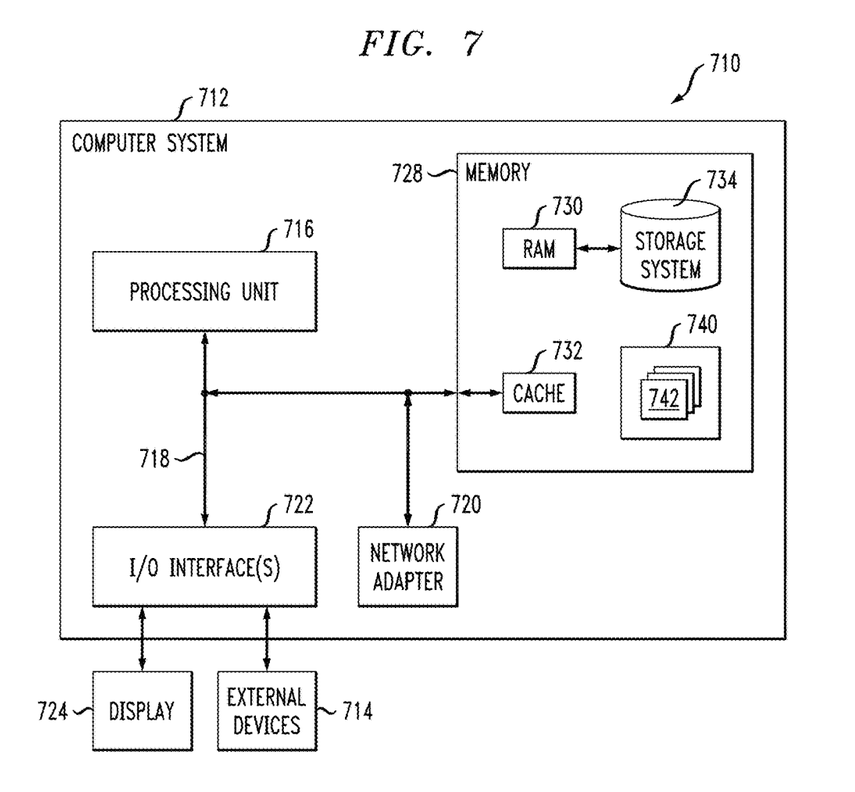
FIG. 7 depicts a computer system in accordance with which one or more components/steps of techniques of the invention may be implemented according to an embodiment of the invention.

One or more embodiments can make use of software running on a general-purpose computer or workstation. With reference to FIG. 7, in a computing node 710 there is a computer system/server 712, which is operational with numerous other general purpose or special purpose computing system environments or configurations. Examples of well-known computing systems, environments, and/or configurations that may be suitable for use with computer system/server 712 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 712 may be described in the general context of computer system executable instructions, such as program modules, being executed by a computer system. Generally, program modules may include routines, programs, objects, components, logic, data structures, and so on that perform particular tasks or implement particular abstract data types. Computer system/server 712 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 712 in computing node 710 is shown in the form of a general-purpose computing device. The components of computer system/server 712 may include, but are not limited to, one or more processors or processing units 716, a system memory 728, and a bus 718 that couples various system components including system memory 728 to processor 716.

The bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 712 typically includes a variety of computer system readable media. Such media may be any available media that is accessible by computer system/server 712, and it includes both volatile and non-volatile media, removable and non-removable media.

The system memory 728 can include computer system readable media in the form of volatile memory, such as random access memory (RAM) 730 and/or cache memory 732. The computer system/server 712 may further include other removable/non-removable, volatile/nonvolatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 718 by one or more data media interfaces. As depicted and described herein, the memory 728 may include at least one program product having a set (e.g., at least one) of program modules that are configured to carry out the functions of embodiments of the invention. A program/utility 740, having a set (at least one) of program modules 742, may be stored in memory 728 by way of example, and not limitation, as well as an operating system, one or more application programs, other program modules, and program data. Each of the operating system, one or more application programs, other program modules, and program data or some combination thereof, may include an implementation of a networking environment. Program modules 742 generally carry out the functions and/or methodologies of embodiments of the invention as described herein.

Computer system/server 712 may also communicate with one or more external devices 714 such as a keyboard, a pointing device, a display 724, etc., one or more devices that enable a user to interact with computer system/server 712, and/or any devices (e.g., network card, modem, etc.) that enable computer system/server 712 to communicate with one or more other computing devices. Such communication can occur via Input/output (I/O) interfaces 722. Still yet, computer system/server 712 can communicate with one or more networks such as a local area network (LAN), a general wide area network (WAN), and/or a public network (e.g., the Internet) via network adapter 720. As depicted, network adapter 720 communicates with the other components of computer system/server 712 via bus 718. It should be understood that although not shown, other hardware and/or software components could be used in conjunction with computer system/server 712. Examples include, but are not limited to, microcode, device drivers, redundant processing units, external disk drive arrays, RAID systems, tape drives, and data archival storage systems, etc.

The flowchart and block diagrams in FIGS. 1-7 illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. In addition, particular features described above with respect to a particular embodiment of the invention are not necessarily limited solely to use in the particular embodiment described. Instead, a single embodiment may include features described above in the context of two or more different embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    predicting availability of a plurality of constituents for one or more future epochs, wherein predicting the availability of the plurality of constituents comprises:
        querying a knowledge database to obtain information associated with current availability of respective ones of the plurality of constituents for a current epoch and to receive information associated with historical availability of respective ones of the plurality of constituents for one or more previous epochs; and
        creating probability distributions of future availability of respective ones of the plurality of constituents for the one or more future epochs utilizing one or more constraints associated with supply chains of respective ones of the plurality of constituents and the received information associated with current and historical availability of respective ones of the plurality of constituents;
    obtaining one or more metrics for each of a plurality of existing work products, each of the plurality of existing work products using at least one of the plurality of constituents, wherein obtaining the one or more metrics comprises:
        querying the knowledge database to obtain information associated with the plurality of existing work products;
        utilizing the obtained information associated with the plurality of existing work products to determine, for respective ones of the existing work products, one or more novelty metrics and one or more quality metrics, the one or more novelty metrics comprising temporal novelty metrics associated with respective constituents, the novelty metric for a given constituent for a given future epoch being based on selection of the given constituent for one or more previous epochs; and
    generating at least one work product for each of the one or more future epochs based in part on the predicted availability of the constituents and the one or more metrics for the existing work products, wherein generating the at least one work product comprises:
        building an optimization model comprising two or more constraints, the two or more constraints comprising an availability-based constraint determined utilizing the predicted availability of the constituents and a creativity-based constraint determined using a computational creativity model that utilizes the quality metrics and novelty metrics associated with the existing work products to compute a creativity metric for respective ones of a plurality of candidate work products different from the existing work products in the knowledge database; and
        utilizing the optimization model to select the at least one work product for each of the one or more future epochs from the plurality of candidate work products;
    wherein the method is performed by at least one processing device comprising a processor coupled to a memory;

wherein the creativity-based constraint is a function of:
amounts of one or more constituents utilized in a given candidate work product;
whether the given candidate work product is selected for a given epoch; and
whether the given candidate work product is selected for two or more consecutive ones of the future epochs; and
wherein the optimization model comprises an objective function that takes into account a transfer cost associated with producing the given candidate work product for the given epoch, the transfer cost being based at least in part on whether the given work product was selected for an epoch preceding the given epoch.

2. The method of claim 1, wherein the constituents comprise raw materials for food dishes and the existing work products and generated work products comprise menus of one or more food dishes.

3. The method of claim 1, wherein the constituents comprise events and the existing work products and generated work products comprise itineraries.

4. The method of claim 1, wherein the constituents comprise raw materials for clothing and the existing work products and generated work products comprise catalogs of clothing items.

5. The method of claim 1, wherein creating the probability distributions is further based on one or more of delivery times for the constituents, seasonal constraints relating to availability of the constituents and climate and weather constraints relating to availability of the constituents.

6. The method of claim 1, wherein the probability distributions comprises stochastic forecasts of availability for respective ones of the constituents for each of the one or more future epochs.

7. The method of claim 1, wherein creating the probability distributions uses at least one of a time series model and a regression forecast.

8. The method of claim 1, wherein the quality metrics are obtained using human hedonic perception scoring metrics based on historical data regarding the constituents and the existing work products.

9. The method of claim 1, wherein the novelty metrics are obtained based on a temporal Bayesian surprise metric.

10. The method of claim 1, wherein the novelty metrics evolve over respective ones of the future epochs.

11. The method of claim 1, wherein:
the optimization model comprising a sequential decision problem for two or more future epochs;
utilizing the optimization model to generate the at least one work product for each of the one or more future epochs comprises utilizing a backward recursion over the two or more future epochs to solve the optimization model; and
the optimization model is formulated to maximize total expected profits over time subject to the two or more constraints.

12. The method of claim 11, wherein the creativity-based constraint specifies that creativity of the at least one generated work product exceeds a user-defined threshold.

13. The method of claim 11, wherein the availability-based constraint specifies that the amounts of constituents used by the at least one generated work product in a given epoch does not exceed predicted availability of the constituents for the given epoch.

14. The method of claim 1, further comprising utilizing the at least one generated work product for each of the one or more future epochs to generate, for each of the one or more future epochs, one or more corresponding inventory orders, a given inventory order specifying respective amounts of constituents to order in a given epoch to satisfy the at least one generated work product associated with the given epoch.

15. The method of claim 1, wherein generating the at least one work product for each of the one or more future epochs comprises, for a given future epoch, generating two or more work products, and further comprising providing the two or more work products to a user device over a network for selection of a given work product to utilize in the given future epoch.

16. An article of manufacture comprising a computer readable storage medium for storing computer readable program code which, when executed, causes a computer to:
predict availability of a plurality of constituents for one or more future epochs, wherein predicting the availability of the plurality of constituents comprises:
querying a knowledge database to obtain information associated with current availability of respective ones of the plurality of constituents for a current epoch and to receive information associated with historical availability of respective ones of the plurality of constituents for one or more previous epochs; and
creating probability distributions of future availability of respective ones of the plurality of constituents for the one or more future epochs utilizing one or more constraints associated with supply chains of respective ones of the plurality of constituents and the received information associated with current and historical availability of respective ones of the plurality of constituents;
obtain one or more metrics for each of a plurality of existing work products, each of the plurality of existing work products using at least one of the plurality of constituents, wherein obtaining the one or more metrics comprises:
querying the knowledge database to obtain information associated with the plurality of existing work products;
utilizing the obtained information associated with the plurality of existing work products to determine, for respective ones of the existing work products, one or more novelty metrics and one or more quality metrics, the one or more novelty metrics comprising temporal novelty metrics associated with respective constituents, the novelty metric for a given constituent for a given future epoch being based on selection of the given constituent for one or more previous epochs; and
generate at least one work product for each of the one or more future epochs based in part on the predicted availability of the constituents and the one or more metrics for the existing work products, wherein generating the at least one work product comprises:
building an optimization model comprising two or more constraints, the two or more constraints comprising an availability-based constraint determined utilizing the predicted availability of the constituents and a creativity-based constraint determined using a computational creativity model that utilizes the quality metrics and novelty metrics associated with the existing work products to compute a creativity metric for respective ones of a plurality of candidate work products different from the existing work products in the knowledge database; and utilizing the optimization model to select the at least one new work product for each of the one or more future epochs from the plurality of candidate work products;

wherein the creativity-based constraint is a function of:
  amounts of one or more constituents utilized in a given candidate work product;
  whether the given candidate work product is selected for a given epoch; and
  whether the given candidate work product is selected for two or more consecutive ones of the future epochs; and
  wherein the optimization model comprises an objective function that takes into account a transfer cost associated with producing the given candidate work product for the given epoch, the transfer cost being based at least in part on whether the given work product was selected for an epoch preceding the given epoch.

17. The article of manufacture of claim 16, wherein the computer readable program code, when executed, further causes a computer to utilize the at least one generated work product for each of the one or more future epochs to generate, for each of the one or more future epochs, one or more corresponding inventory orders, a given inventory order specifying respective amounts of constituents to order in a given epoch to satisfy the at least one generated work product associated with the given epoch.

18. An apparatus comprising:
  a memory; and
  a processing device operatively coupled to the memory and configured to:
  predict availability of a plurality of constituents for one or more future epochs, wherein predicting the availability of the plurality of constituents comprises:
    querying a knowledge database to obtain information associated with current availability of respective ones of the plurality of constituents for a current epoch and to receive information associated with historical availability of respective ones of the plurality of constituents for one or more previous epochs; and
    creating probability distributions of future availability of respective ones of the plurality of constituents for the one or more future epochs utilizing one or more constraints associated with supply chains of respective ones of the plurality of constituents and the received information associated with current and historical availability of respective ones of the plurality of constituents;
  obtain one or more metrics for each of a plurality of existing work products, each of the plurality of existing work products using at least one of the plurality of constituents, wherein obtaining the one or more metrics comprises:
    querying the knowledge database to obtain information associated with the plurality of existing work products;
    utilizing the obtained information associated with the plurality of existing work products to determine, for respective ones of the existing work products, one or more novelty metrics and one or more quality metrics, the one or more novelty metrics comprising temporal novelty metrics associated with respective constituents, the novelty metric for a given constituent for a given future epoch being based on selection of the given constituent for one or more previous epochs; and
  generate at least one work product for each of the one or more future epochs based in part on the predicted availability of the constituents and the one or more metrics for the existing work products, wherein generating the at least one work product comprises:
    building an optimization model comprising two or more constraints, the two or more constraints comprising an availability-based constraint determined utilizing the predicted availability of the constituents and a creativity-based constraint determined using a computational creativity model that utilizes the quality metrics and novelty metrics associated with the existing work products to compute a creativity metric for respective ones of a plurality of candidate work products different from the existing work products in the knowledge database; and
    utilizing the optimization model to select the at least one new work product for each of the one or more future epochs from the plurality of candidate work products;
  wherein the creativity-based constraint is a function of:
    amounts of one or more constituents utilized in a given candidate work product;
    whether the given candidate work product is selected for a given epoch; and
    whether the given candidate work product is selected for two or more consecutive ones of the future epochs; and
    wherein the optimization model comprises an objective function that takes into account a transfer cost associated with producing the given candidate work product for the given epoch, the transfer cost being based at least in part on whether the given work product was selected for an epoch preceding the given epoch.

19. The apparatus of claim 18, wherein the processing device is further configured to utilize the at least one generated work product for each of the one or more future epochs to generate, for each of the one or more future epochs, one or more corresponding inventory orders, a given inventory order specifying respective amounts of constituents to order in a given epoch to satisfy the at least one generated work product associated with the given epoch.

20. The method of claim 14, wherein the objective function couples generation of the at least one work product for each of the one or more future epochs with generation of the corresponding inventory orders for the one or more future epochs.

* * * * *